Dec. 3, 1940.  B. S. SELTENREICH ET AL  2,223,834
AIRCRAFT SKI BOARD SUPPORTING APPARATUS
Filed July 3, 1939   2 Sheets-Sheet 1

INVENTOR.
Bud S. Seltenreich
& William F. Bunsen
BY
A. B. Bowman
ATTORNEY.

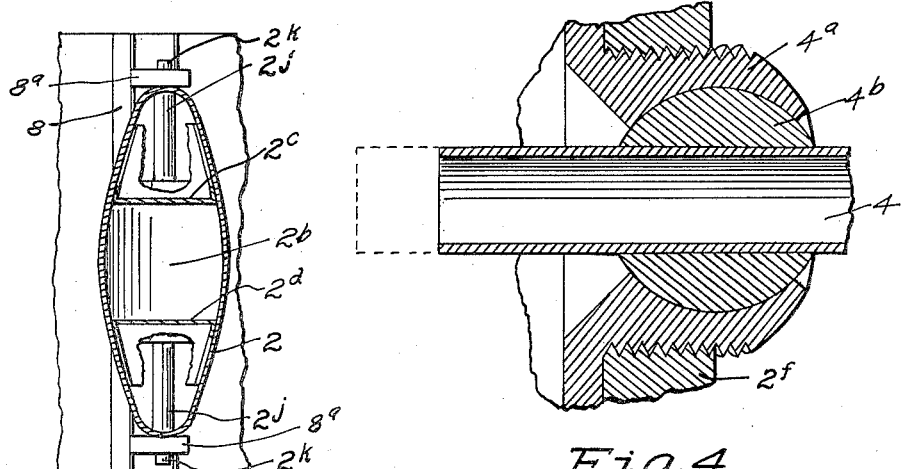
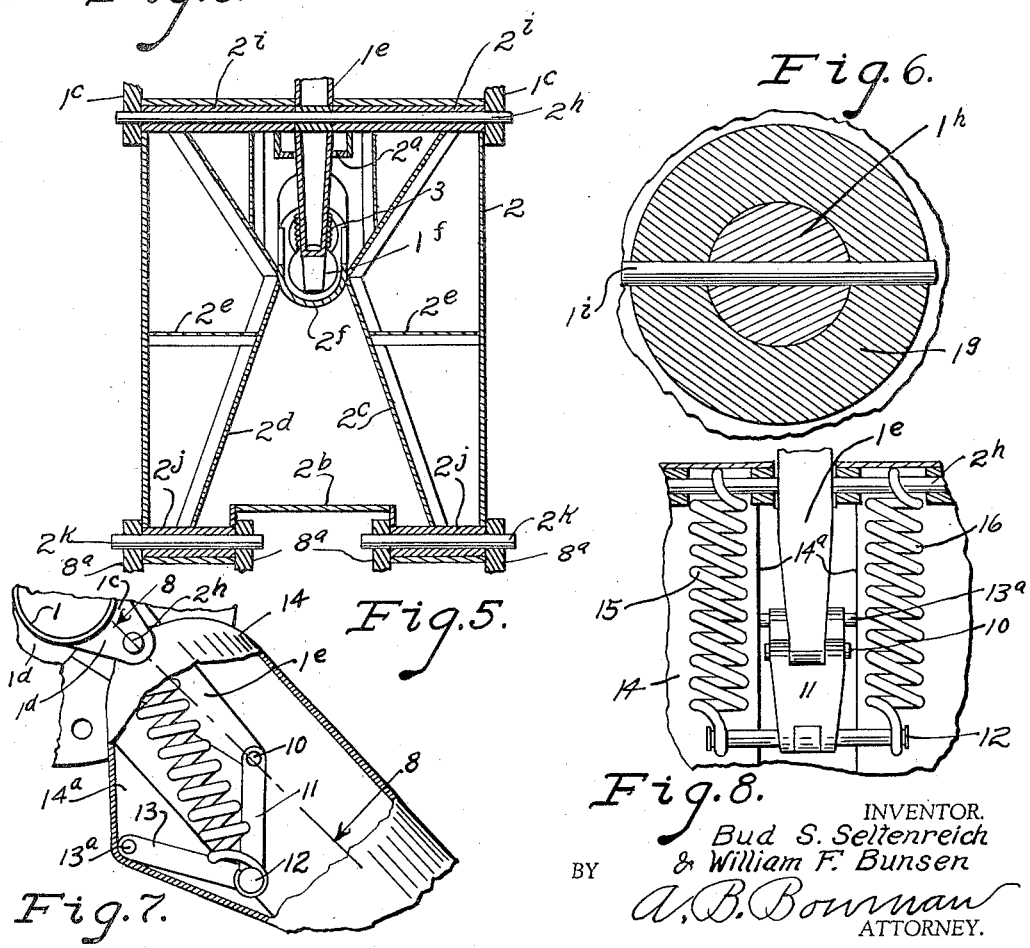

Patented Dec. 3, 1940

2,223,834

UNITED STATES PATENT OFFICE 2,223,834

AIRCRAFT SKI BOARD SUPPORTING APPARATUS

Bud S. Seltenreich and William F. Bunsen, Mission Beach, Calif.

Application July 3, 1939, Serial No. 282,732

10 Claims. (Cl. 244—108)

Our invention relates to an apparatus for supporting ski boards for landing aircraft on snow or ice and the objects of our invention are:

First, to provide a novel, resilient apparatus for connection with an airplane for supporting ski boards;

Second, to provide an apparatus of this class which is self contained and automatic in its action;

Third, to provide an apparatus of this class which requires no liquid shock absorbers to be used in connection therewith;

Fourth, to provide an apparatus of this class which provides forward and backward yielding and upward and downward yielding of the ski boards relatively to the aircraft;

Fifth, to provide an apparatus of this class which eliminates the necessity of any external cable or shock cord;

Sixth, to provide an apparatus of this class which is easily applied to the conventional aircraft by removing the conventional wheel and brake and securing our apparatus directly to the brake flange;

Seventh, to provide an apparatus of this class which may be readily applied to various types of aircraft in connection with the wheel supporting mechanism; and Eighth, to provide an apparatus of this class which is very simple and economical of construction, easy to operate, efficient in its action and which will not readily deteriorate or get out of order.

Figure 1:
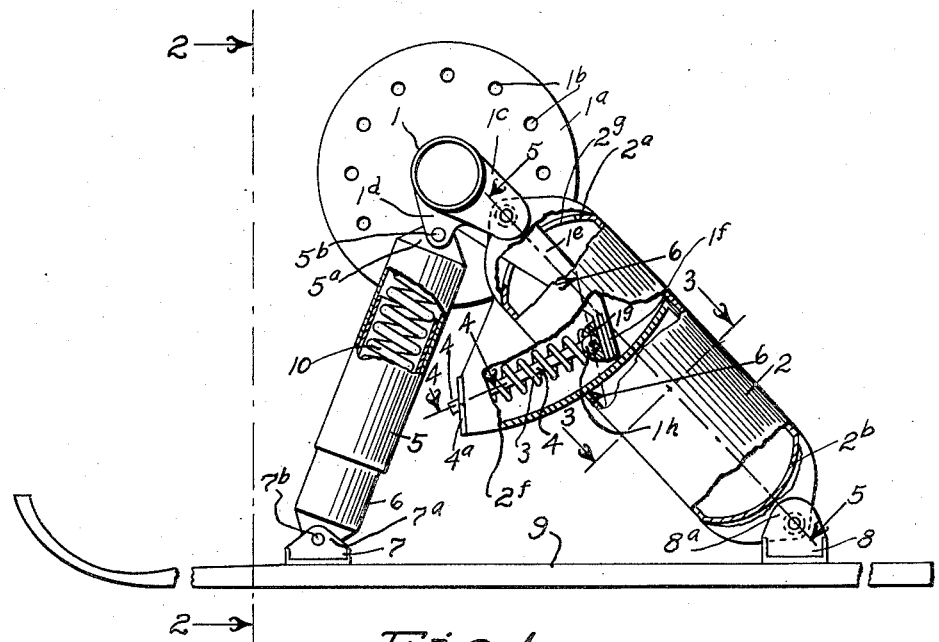
Figure 2:
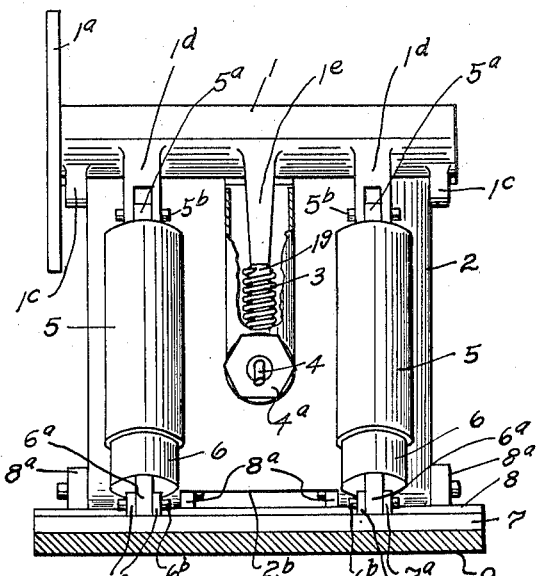

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of our aircraft ski board supporting apparatus showing one unit shown with a portion broken away and in section to facilitate the illustration and showing the ski board member fragmentarily; Fig. 2 is a front sectional view taken from the line 2—2 of Fig. 1 and showing further section broken away to facilitate the illustration; Fig. 3 is a fragmentary sectional view taken from the line 3—3 of Fig. 1; Fig. 4 is an enlarged sectional view taken from the line 4—4 of Fig. 1; Fig. 5 is an enlarged sectional view taken from the line 5—5 of Fig. 1 and showing some of the portions in elevation to facilitate the illustration; Fig. 6 is an enlarged sectional view taken from the line 6—6 of Fig. 1 showing some of the portions in elevation to facilitate the illustration; Fig. 7 is a fragmentary partial elevational and sectional view of a modified form of support and strut casing; and Fig. 8 is a fragmentary sectional view taken from the line 8—8 of Fig. 7 showing some of the parts in elevation to facilitate the illustration.

Similar characters of reference refer to similar parts and portions throughout the several views of the drawings:

The main support 1, main strut casing 2, main strut spring 3, main strut spring guide 4, telescope strut casings 5 and 6, coonnecting members 7 and 8 and ski board member 9 constitute the principal parts and portions of our aircraft ski board supporting apparatus.

The main support 1 is a hollow tubular member provided with a flange 1a on one end and it is substantially coextensive with the conventional brake flange to which the wheel and brake of the conventional aircraft is secured. It is provided with a plurality of holes 1b for receiving bolts for securing said member 1a in position. This member 1 is also provided with extended lug members 1c and 1d. The lug members 1c are positioned at the opposite ends of the member 1 and are single lugs extended some distance from the center of the tubular member 1, while the lugs 1d are bifurcated, as shown best in Fig. 2 of the drawings and they are positioned inwardly on the member 1 from the lugs 1c. Positioned substantially in the middle, between the lugs 1c on the member 1 and extending outwardly in substantially the same direction is an arm member 1e. This arm member 1e extends downwardly and backwardly on an angle, as shown best in Fig. 1 of the drawings and is provided at its extended end with an angularly disposed end portion 1f on the one side of which is mounted a ball socket member 1g. Pivotally mounted in this ball socket member 1g is a ball member 1h supported by a pin 1i, shown best in Fig. 6 of the drawings, and secured to this ball member 1h is a spring guide 4 which extends outwardly substantially at right angles to an angular portion 1f of the arm 1e. The extended end of this arm 1e is shiftably mounted in the main strut casing 2. This main strut casing 2 is oblong in cross section, as shown best in Fig. 3 of the drawings and is a hollow casing provided with rounded ends 2a and 2b and is provided with two angularly disposed partitions 2c and 2d which converge from the opposite ends, as shown best in Fig. 5 of the drawings. It is also provided with cross partitions 2e which intersect with the partitions 2c and 2d, all of which serve as reinforcing partitions and supports. Interposed between the partitions 2c and 2d at their closest point slightly above the middle of the member 2 is a substantially semi-circular arcuate partition 2f, shown best in Figs. 1 and 5 of the drawings. This partition 2f is substantially on an arcuate radius from the center of the support 1 and serves as a housing for the spring 3 which is mounted on the spring guide 4 secured to the ball member 1h. Therefore this partition 2f extends past the side wall of the member 2 some distance as shown best in Fig. 1 of the drawings and is provided with extended closed side walls and open at its upper side as shown best in Fig. 5 of the drawings. At its extended end it is provided with a socket like plug 4a screw threaded in a straight portion thereof and mounted in this socket portion 4a is a ball member 4b which is provided with a central bore in which is shiftably mounted the extended end of the spring guide 4, which is preferably a hollow member, all as shown best in Fig. 4 of the drawings. The end 2a of the member 2 is provided with a slot 2g which permits the relative rocking of the arm member 1e with the member 2 controlled by the tension of the spring 3 on the spring guide 4 in the housing partition 2f. The casing member 2 is pivotally supported on the lugs 1c between the same on a bearing shaft 2h, shown best in Figs. 1 and 5 of the drawings. Surrounding the shaft 2h is a bearing tube 2i, shown best in Fig. 5 of the drawings. Mounted in the lower end of the member 2 are bearings 2j in which are positioned the shafts 2k and these shafts 2k are supported in lugs 8a which extend upwardly from the channel shaped connecting member 8 which is secured to the upper side of the ski board member 9, shown best in Figs. 1 and 2 of the drawings. Secured to the upper side of the ski board 9 forwardly of the connecting member 8 is a similar connecting member 7 but of slightly lighter weight. It is provided with upwardly extending pairs of lugs 7a. Between each pair is mounted a lug 6a by means of pins 6b for pivotal action. These lugs 6a are mounted on the inner telescoping member 6 which is of hollow and cylindrical form, as shown best in Fig. 1 of the drawings and is telescopically mounted in a similar hollow cylindrical member 5 and this cylindrical member 5 is provided with lugs 5a which are pivotally mounted in the bifurcated lugs 1d by means of pins 5b, shown best in Figs. 1 and 2 of the drawings. It will be here noted that there are two of these telescopic members 5 and 6 positioned for operation between the ski board 9 and the main support 1. Positioned in the member 6 and extending to the bottom of the member 5 is a compression spring 10, as shown in Fig. 1 of the drawings.

The operation of our aircraft ski board supporting apparatus is substantially as follows:

The conventional landing wheel and brake are removed and the flange 1a of the main support 1 is bolted to the brake flange for the conventional wheel, one of the apparatus on each side in substitution for the conventional wheel on each side, and the apparatus is ready for operation without any external controls of any kind and operates automatically without any liquid shock absorbers and without external cable or shock cords of any kind. With the engagement of the ski boards with snow or ice, the spring 10 is compressed permitting the telescopic action of the members 5 and 6. The ground pressure under the ski members 9 causes a relative shifting of the member 2 with the arm member 1e which causes action of the spring 3 on the guide 4 providing a cushion action for both upward and forward and backward movement of the ski member and the two struts, including the members 5 and 6 and the casing 2, together with their spring provide a combined automatic cushion action for the control of the ski members and the action is directed to the axle of the aircraft through the brake flange. When clear of the ground the action of the spring 3 contained in and bearing upon the main casing 2 causes the apparatus to move forward into its unloaded position and maintains it there until contact with the ground is again made.

In the modification shown in Figs. 7 and 8 of the drawings the main support 1 is the same as that shown in Figs. 1 to 6 inclusive and all of the rest of the structure is the same as that shown in Figs. 1 to 6 except that the arm member 1e is straight and is provided with a pin 10 in its extended end upon which is pivotally mounted a link member 11. At the opposite end of this link member 11 is pivotally connected a shaft 12 and pivotally connected to this shaft 12 is another link member 13 which is extended some distance and is pivotally connected in the casing by a pin 13a, the casing 14 being provided with extended side walls 14a for receiving the extended ends of this pin 13a. Secured to the extended ends of the shaft 12, as shown best in Fig. 8 of the drawings are two tension springs 15 and 16. The opposite ends of these springs are secured over the shaft 2h as shown best in Fig. 8 of the drawings. It is to be noted that the interior of the casing 14 is different from that shown in the other views of the drawings to accommodate this modified construction, as shown in Figs. 7 and 8 of the drawings.

Though we have shown and described a particular construction, combination and arrangement of parts and portions and certain modifications thereof, we do not wish to be limited to this particular construction, combination and arrangement, nor to the modifications, but desire to include in the scope of our invention, the construction, combination and arrangement substantially as set forth in the appended claims.

Having thus described our invention, what we claim as new and desire to secure by Letters Patent is:

1. In an aircraft ski board supporting apparatus of the class described, the combination of a support rigidly connected to an aircraft wheel support, a spring cushion member pivotally connected therewith and extending forwardly and downwardly therefrom, a ski board pivotally connected therewith at the lower forward end of said cushion member, a casing pivotally connected to said support at its upper end and extending downwardly and backwardly therefrom and pivotally connected to said ski board at its lower end, an arm secured to said support and extening into said casing member to intermediate its ends, and a cushion spring interposed between the end of said arm and a side extended portion of said casing member.

2. In an aircraft ski board supporting apparatus of the class described, the combination of a support rigidly connected to an aircraft wheel support, a spring cushion member pivotally connected therewith and extending forwardly and downwardly therefrom, a ski board pivotally connected therewith at the lower forward end of said cushion member, a casing pivotally connected to said support at its upper end and extending downwardly and backwardly therefrom and pivotally connected to said ski board at its lower end, an arm secured to said support and extending into said casing member to intermediate its ends, a cushion spring interposed between the end of said arm and a side extended portion of said casing member, said cushion spring being positioned at a substantially right angle to said casing member and in pivotal engagement with said arm.

3. In an aircraft ski board supporting apparatus of the class described, the combination of a support rigidly connected to an aircraft wheel support, a spring cushion member pivotally connected therewith and extending forwardly and downwardly therefrom, a ski board pivotally connected therewith at the lower forward end of said cushion member, a casing pivotally connected to said support at its upper end and extending downwardly and backwardly therefrom and pivotally connected to said ski board at its lower end, an arm secured to said support and extending into said casing member to intermediate its ends, a cushion spring interposed between the end of said arm and an extended portion of said casing member, said cushion spring being positioned at a substantially right angle to said casing member and in pivotal engagement with said arm, and a guide means for said spring extending through the side wall of said casing.

4. In an aircraft ski board supporting apparatus of the class described, the combination of a tubular member provided with a flange at one end and extending at right angles thereto provided with holes arranged to be secured to the brake flange of an aircraft, said tubular member provided with forwardly and downwardly extending lugs and with backwardly and downwardly extending lugs, telescoping cushion members pivotally connected with said forwardly and downwardly extending lugs, a ski board pivotally connected with the lower end of said telescoping cushion members, a casing member pivotally connected at its upper end with said backwardly and downwardly extending lugs and extending backwardly and downwardly therefrom and pivotally connected to said ski board at its lower end, a spring supported in said casing and extending from one side thereof, and an arm secured to said tubular support intermediate its ends and extending into said casing and its extended end engaging said spring.

5. In an aircraft ski board supporting apparatus of the class described, the combination of a tubular member provided with a flange at one end and extending at right angles thereto provided with holes arranged to be secured to the brake flange of an aircraft, said tubular member provided with forwardly and downwardly extending lugs and with backwardly and downwardly extending lugs, telescoping cushion members pivotally connected with said forwardly and downwardly extending lugs, a ski board pivotally conected with the lower end of said telescoping cushion members, a casing member pivotally connected at its upper end with said backwardly and downwardly extending lugs and extending backwardly and downwardly therefrom and pivotally connected to said ski board at its lower end, a spring supported in said casing and extending from one side thereof, and an arm secured to said tubular support intermediate its ends and extending into said casing and its extended end engaging said spring, and a guide means for said spring in connection with said arm member and extending through the side wall of said casing.

6. In an aircraft ski board supporting apparatus of the class described, the combination of a support, a spring cushion member pivotally connected to said support and extending forwardly and downwardly therefrom, a casing member pivotally connected to said support and extending backwardly and downwardly therefrom, a ski board pivotally connected to the lower ends of both of said spring cushion member and said casing, an arm member secured to said support and extending into said backwardly and downwardly extending casing member, and spring means connected with the lower end of said arm and means for supporting said spring means in relation with said casing and arm.

7. In an aircraft ski board supporting apparatus of the class described, the combination of a support, a spring cushion member pivotally connected to said support and extending forwardly and downwardly therefrom, a casing member pivotally connected to said support and extending backwardly and downwardly therefrom, a ski board pivotally connected to the lower ends of both of said spring cushion member and said casing, an arm member secured to said support and extending into said backwardly and downwardly extending casing member, spring means connected with the lower end of said arm and means for supporting said spring means in relation with said casing and arm, said backwardly and downwardly extending casing including a hollow casing provided with angularly disposed longitudinal and cross partitions.

8. In an aircraft ski board supporting apparatus of the class described, the combination of a support, a spring cushion member pivotally connected to said support and extending forwardly and downwardly therefrom, a casing member pivotally connected to said support and extending backwardly and downwardly therefrom, a ski board pivotally connected to the lower ends of both said spring cushion member and said casing, an arm member secured to said support and extending into said backwardly and downwardly extending casing member, spring means connected with the lower end of said arm and means for supporting said spring means in relation with said casing and arm, said backwardly and downwardly extending casing including a hollow casing provided with angularly disposed longitudinal and cross partitions, and and arcuate semi-cylindrical in cross section spring guide.

9. In air aircraft ski board supporting apparatus of the class described, the combination of a support rigidly connected to an aircraft wheel support, a spring cushion member pivotally connected therewith and extending forwardly and downwardly therefrom a ski board pivotally connected therewith at the lower forward end of said cushion member, a casing pivotally connected to said support at its upper end and extending downwardly and backwardly therefrom and pivotally connected to said ski board at its lower end, an arm member secured to said support and extending into said casing member to intermediate its end, a link pivotally connected with the extended end of said arm, another link pivotally connected to the free end of said link and its opposite end pivotally connected to said casing at one side thereof and a pair of tension springs one positioned on each side of said arm and secured to the pivotal connection of said link, their opposite ends connected to the pivotal support of said casing.

10. In an aircraft ski board supporting apparatus of the class described, the combination of a support rigidly connected to an aircraft wheel support, a spring cushion member pivotally connected therewith and extending forwardly and downwardly therefrom, a ski board pivotally connected therewith at the lower forward end of said cushion member, a casing pivotally connected to said support at its upper end and extending downwardly and backwardly therefrom and pivotally connected to said ski board at its lower end, an arm member secured to said support and extending into said casing member to intermediate its end, a link pivotally connected with the extended end of said arm, another link pivotally connected to the free end of said link and its opposite end pivotally connected to said casing at one side thereof, a pair of tension springs, one positioned on each side of said arm and secured to the pivotal connection of said link, their opposite ends connected to the pivotal support of said casing, said casing provided with inwardly extending portions for supporting the extended end of the second link member.

BUD S. SELTENREICH.
WILLIAM F. BUNSEN.